United States Patent
Niemi

[15] 3,641,643
[45] Feb. 15, 1972

[54] PRESSURE APPLICATOR

[72] Inventor: William Niemi, 28122 Deep Creek Drive, Saugus, Calif. 91350

[22] Filed: May 19, 1969

[21] Appl. No.: 825,776

[52] U.S. Cl. .................................................. 29/110.5, 156/579
[51] Int. Cl. ............................................................. B05c 1/08
[58] Field of Search ............ 29/110.5, 116; 15/103.5, 230.11; 7/14.1 A; 156/579

[56] References Cited

UNITED STATES PATENTS

| 563,044 | 6/1896 | Lewis | 29/110.5 |
| 1,433,576 | 10/1922 | Utke | 29/110.5 |
| 1,461,815 | 7/1923 | Bird | 29/110.5 |
| 1,637,450 | 8/1929 | Martin | 29/110.5 |
| 3,127,299 | 3/1964 | Hecht | 156/579 |

*Primary Examiner*—Alfred R. Guest
*Attorney*—Roger A. Marrs

[57] ABSTRACT

A pressure applicator is disclosed herein having spaced-apart parallel side members joined at their opposite ends by a pair of hand-pressure elements and joined at their midsections by at least a single hard roller having a portion of its periphery extending beyond the bottom edge of the side members. The undersurfaces of the side members converge from the opposite ends towards the midsection so that the roller serves as a fulcrum about which the opposite ends may pivot when hand pressure is exerted on the pair of elements to forcibly and rollably engage the roller surface against a prepared laminated product.

3 Claims, 6 Drawing Figures

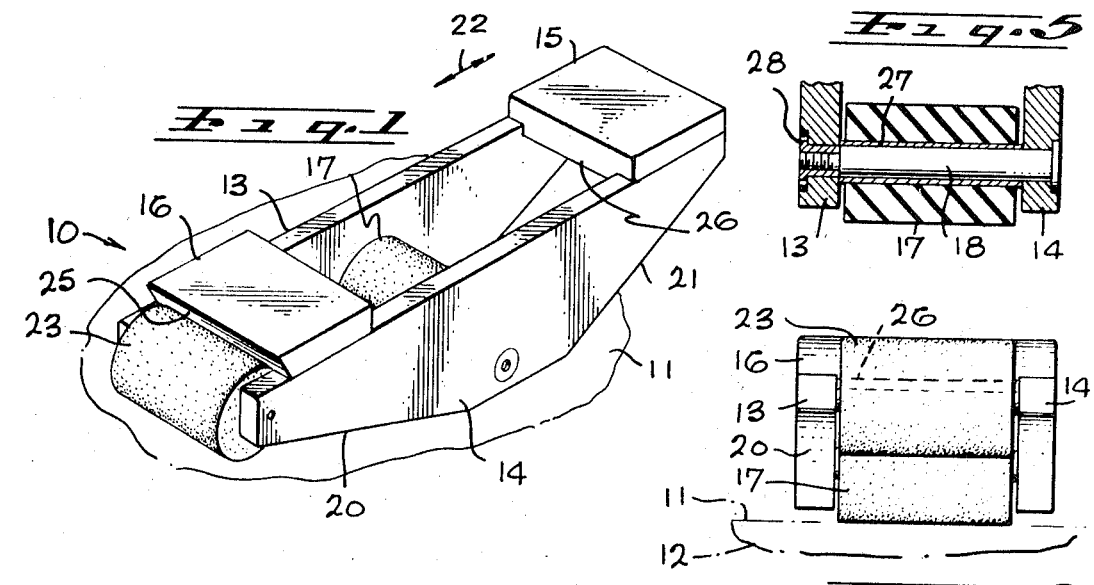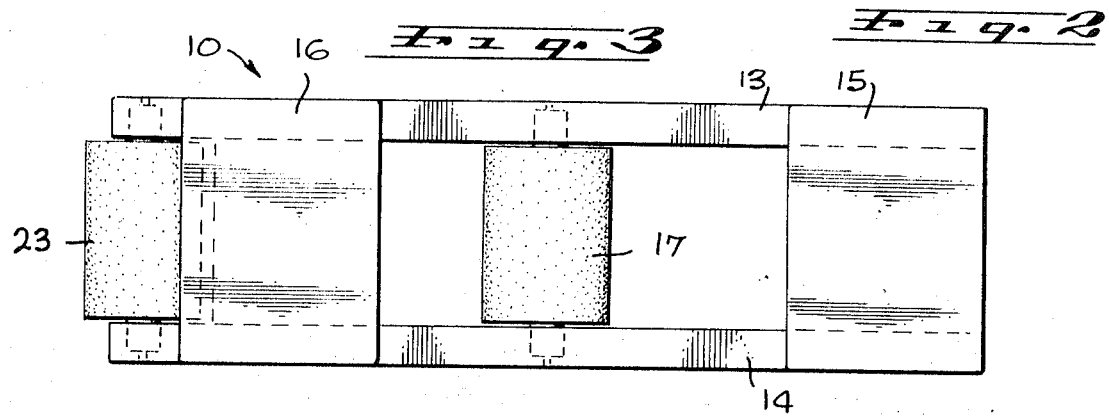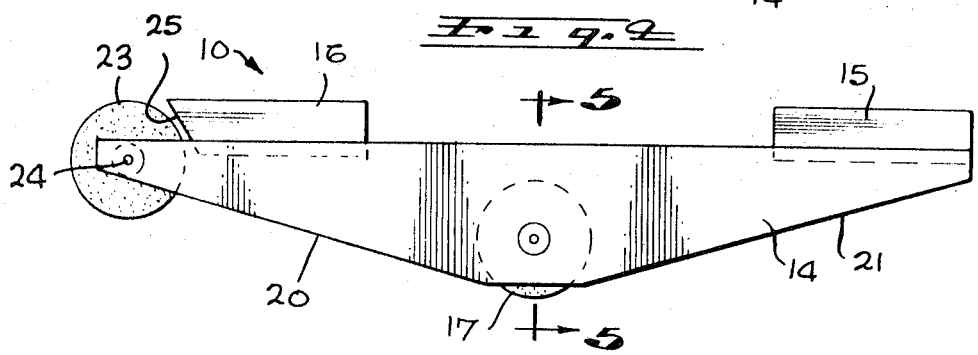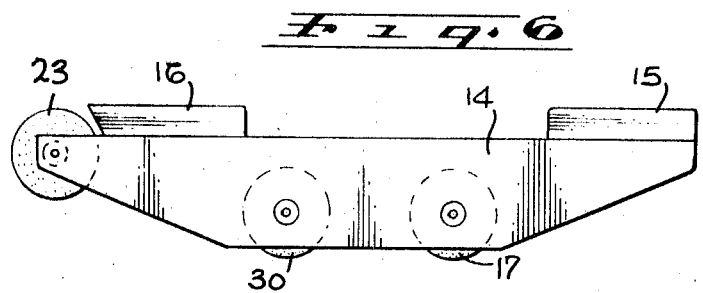
WILLIAM NIEMI
INVENTOR.
BY Roger G. Marrs

PRESSURE APPLICATOR

BACKGROUND OF THE INVENTION

1. Field of the Invention

This invention relates to pressure rollers for distributing applied force to surface areas of a laminated product and, more particularly, to a novel pressure applicator adapted to be manually manipulated over selected surface areas so as to provide a stable and balanced laminating pressure without damaging or otherwise marring the surface area.

2. Description of the Prior Art

In the field of laminated parts fabrication or construction, it is common practice to stack several sheets or layers of material together which are separated by a suitable bonding agent or adhesive. Pressure is then exerted on the opposite sides of the stack so that the bonding agent or adhesive material, such as contact cement, between the opposing surfaces of the sheets or layers totally occupies the area between opposing surfaces of the respective sheets. Unless the bonding agent or adhesive contacts opposing surfaces of the sheets or layers, voids or spaces will remain which weaken the structure of the laminated product and, in some instances, will result in a slight bulge or crown in the exterior surface of the outermost layers. Such bulges or crowns are unacceptable when the fabricated laminate is employed as a decorative member such as a tabletop or counter.

Typical tops or counters may take the form of laminated Formica in which the exposed surface of the stack is intended to be absolutely smooth and void of bulges or crowns which would visually indicate imperfection in the construction. Normally, a baseboard is employed on which a suitable amount of contact cement is applied to one side of the base and on the bottom side of the plastic material sheet. Pressure is then applied to thoroughly engage the adhesive cement with the underside of the Formica and the opposing side of the board.

When such laminated products are fabricated, pressure may be exerted on the stacked sheets by means of a hydraulic press. Although this method applies an evenly distributed load or force to spread the adhesive and effect total engagement of the adhesive with the opposing surfaces of the sheets, such equipment is not available for use in small workshops, on-the-job fabrication, and other limited sites. Conventionally, an alternate method is to employ a hand-held roller device which is rotatably carried on one end of an elongated handle and has a hand grip portion carried on the opposite end of the handle. The handle generally takes the form of a rigid wire or rod which is bent at one end to form an axle which, in turn, is rotatably secured to the roller. When in use, substantial muscular effort must be employed to force the rolling surface of the roller into engagement with the surface of the laminated stack of sheets to attain sufficient pressure for proper contact of bonding agent or adhesive cement between the opposing surfaces of the sheets. Since the handle of the roller cannot be successfully operated in a manner normal to the roller engaging surface of the laminated product, the handle is normally held by the hand of the workman at approximately a 45° angle to the surface which increases the physical exertion expended by the workman. Another difficulty encountered is that the pressure of the roller is uneven as the roller progresses over the surface due to the relaxation of the workman as he stretches or moves the roller further away from his body. Another difficulty resides in the fact that it is difficult to apply pressure at the corner areas of a square or rectangular laminated product without the occurrence of slippage of the roller or rolling of the device off the laminated surface.

Therefore, it can be seen that a long standing need has existed to provide a pressure roller operated by a workman which applied and distributes pressure evenly across the surface of a laminated product which is simple to use, economical to manufacture and which does not prove tiring when in use as compared to conventional rolling devices.

SUMMARY OF THE INVENTION

Accordingly, the difficulties and problems encountered with conventional rolling devices for pressing laminated products are obviated by the present invention which provides a frame having a roller means mounted midway between its opposite ends so that a portion of its periphery is available for forcibly engaging with the surface of a laminated product. The opposite ends of the frame are provided with means for receiving the hands of the user whereby the frame may be pivoted about the axle of the roller. A workman may position himself adjacent the device and grasp the hand grips whereby manual force may be conveyed through the frame and roller means to the surface of the laminated product. The device may be rolled in front of the workman by manual manipulation with the opposite ends of the frame being balanced to continuously conduct applied pressure through the frame and roller to the working surface of the laminated product.

A feature of the invention resides in providing end portions of the frame with reduced thicknesses as compared to the midsection of the frame by angling the under edges or surfaces of the frame in a converging manner from the opposite ends to the midsection. The device may be rolled in front of the workman and pivoted slightly on the roller axis without engaging the frame with the surface being worked upon. Also, a feature of the invention resides in providing a roller rotatably mounted on a selected end of the frame and having a portion of its rolling surface extending beyond the frame whereby the frame may be tipped so as to be rollably supported on the roller at its midsection and the roller at its end for supplying pressure to corners and other selected areas of the laminated product.

Therefore, it is among the primary objects of the present invention to provide a novel pressure roller apparatus adapted to be grasped by both hands of a workman and having a roller adapted to be forcibly urged against a working surface of a laminated product for applying manual pressure thereto.

Another object of the present invention is to provide a novel pressure roller wherein the roller serves as a fulcrum for a frame adapted to transfer pressure from the opposite ends of the frame and through the axle and roller into a laminated structure.

Another object of the present invention is to provide a novel rolling apparatus for evenly distributing applied pressure loads to selected areas of a laminated structure.

Yet another object of the present invention is to provide a novel hand-held, pressure-applying apparatus adapted to be moved along the surface of a laminated structure for applying pressure loads to the structure which will not tire nor strain the the workman operating the device.

Still a further object of the present invention is to provide a novel pressure applicator having a pair of rollers cooperating to permit application of pressure through the rollers to a selected area of the laminated structure such as a corner, for example.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a perspective view of the novel pressure applicator of the roller type incorporating the present invention;

FIG. 2 is an end elevational view of the applicator shown in FIG. 1;

FIG. 3 is a top plan view of the applicator;

Fig. 4 is a side elevational view of the applicator;

FIG. 5 is a cross-sectional view of the applicator as taken in the direction of arrows 5—5 of FIG. 4; and FIG. 6 is a side elevational view of another embodiment of the present invention.

DESCRIPTION OF THE PREFERRED EMBODIMENTS

Referring to FIGS. 1-4 inclusive, the novel pressure applicator of the present invention is indicated in the general direction of arrow 10 and is illustrated in connection with applying and distributing pressure load forces to the surface 11 of a laminated product 12. The device includes a frame comprising a pair of side members or rails 13 and 14 arranged in fixed spaced apart parallel relationship which are joined at their opposite ends along the upper surface thereof by hand-pressure elements 15 and 16. The side members are further joined at their midsections by a roller 17. The roller 17 is of shorter length that the dimensional width between the side members 13 and 14 and is rotatably carried by the side members via an axle shaft 18 having its opposite ends secured to the respective side members. Preferably, the roller is composed of hard rubber or other resilient but firm material.

A feature of the present invention resides in providing angular undersurfaces 20 and 21 formed in the opposite ends of the frame which converge or taper from the opposite ends of the frame toward the midsection mounting the roller 17. This construction permits the frame to be pivoted about the roller when a differential pressure is applied to opposite ends of the frame via the hand-pressure elements 15 and 16.

In actual operation, a workman places the pressure applicator 10 on the surface 11 of the laminated product 12. Each of the workman's hands are placed on the exposed surface of the elements 15 and 16 with the fingers of each hand disposed beneath the elements between the side members. Manual pressure is exerted, through the elements 15 and 16, into the frame and through the roller 17 to the laminated product. By moving his arms back and forth, the workman may move the applicator 10 in a rolling manner over the surface of the laminated product in a reciprocal manner as indicated by the double arrow 22. As the device moves from side to side in front of the workman, a pressure differential will be generated on the opposite ends of the frame which would normally cause the frame to pivot or tilt about the axle 18. However, since the frame is pivotally mounted on the roller, the pressure differential can be compensated for by increasing the arm or hand pressure on one end of the frame and decreasing the pressure on the opposite end of the frame. This action provides for a substantially constant pressure on the roller as it moves over the working surface.

Another major feature of the present invention resides in the provision of a roller 23 rotatably mounted on axle 24 between the side members 13 and 14. A portion of the peripheral rolling surface of roller 23 extends beyond a selected end of the frame and this roller may be employed to engage the working surface in selected areas thereof, such as a corner, for example. In this application, the workman's hands will grasp elements 15 and 16 with both the rolling surfaces of rollers 17 and 23 engaging the working surface with maximum pressure being applied to the hand-pressure element 16 which is adjacent to the roller 23. In FIG. 4, it can be seen that the outside end of element 16 includes a beveled edge 25 arranged in close proximity to the roller surface of roller 23. This construction permits the element 16 to be located near the end of the frame while at the same time permitting mounting of the roller 23 to the side members so as to attain adequate support via axle 24.

Referring now to FIG. 2, it can be seen that the hand-pressure elements, such as element 15, are formed with elongated channels on the opposite sides thereof which conform to the thickness of each of the side members so that the upper surface of each side member will reside within the respective end channel formed in the element. This provides a portion 26 of the element which resides between the side members while the major thickness of the element resides on the upper surface of the side members.

Referring now to FIG. 5, it can be seen that the axle 18 is carried within a suitable bearing 27 carried on the roller 17. Preferably, the roller 17 is removable from the device by providing a releasable fastening means which may take the form of a threaded fastener 28 adapted to be threadably received on the end of axle 18. However, if desired, axle 18 may simply take the form of a knockout member which may travel through the side members and the bearing 27 when struck by a suitable punch and hammer.

With reference to FIG. 6, another embodiment of the present invention is shown which includes a second supporting roller 30 employed in combination with the roller 17 for balancing and stabilizing the device as pressure is placed on the elements 15 and 16. The roller 30 takes the same form and mounting construction as previously described with respect to roller 17. Preferably, rollers 17 and 30 are disposed in close proximity with respect to each other so that the frame will not readily tilt or pivot as pressure is applied to the opposite ends thereof.

In view of the foregoing, it can be seen that a novel pressure applicator is disclosed by which manual pressure may be applied to a working surface. By means of the roller means and its location with respect to the opposite ends of the frame, the device may be made stable and balanced during use while being adapted to transmit applied pressures and load forces directly into the underlying laminated product 12.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A manual pressure applicator comprising:
an elongated frame having top and bottom edges;
said frame comprising a pair of side members arranged in fixed spaced apart parallel relationship joined together at their opposite ends by a pair of flat members fixed on said top edge constituting a hand-pressure element to be engaged by the hands of a workman for applying a load to said frame;
a first roller rotatably carried on said frame between said members midway between its opposite ends and having a portion of said first roller peripheral surface extending beyond said bottom edge for transferring the applied load to a working surface via said roller;
said frame bottom edge forming a diverging taper extending from the opposite ends of said frame to terminate adjacent the opposite sides of said first roller peripheral portion extending below said bottom edge;
a second roller carried on a selected end of said frame having a portion of its peripheral surface extending below the bottom edge of said side members for a lesser distance from the top edge of the side members than said first roller; and
said first and second rollers including releasable fastener means for detachably connecting said rollers to said frame.

2. The invention as defined in claim 1 wherein
one of said flat members carried on said selected frame end between second roller and said first mentioned roller; and
the other of said flat members carried on said frame at its end opposite to said selected end.

3. The invention as defined in claim 2 wherein said member disposed between said second roller and said first roller is formed with a beveled end in close proximity to said second roller.

* * * * *